(12) United States Patent
Fujii et al.

(10) Patent No.: US 6,406,809 B1
(45) Date of Patent: Jun. 18, 2002

(54) FUEL CELL COMPRISING A SEPARATOR PROVIDED WITH COOLANT PASSAGES

(75) Inventors: Yosuke Fujii; Yoshinori Wariishi; Narutoshi Sugita; Masaharu Suzuki, all of Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/497,576

(22) Filed: Feb. 3, 2000

(30) Foreign Application Priority Data

Feb. 9, 1999 (JP) ............................................. 11-031760

(51) Int. Cl.[7] ................................................. H01M 8/00
(52) U.S. Cl. ............................. 429/34; 429/12; 429/24; 429/26; 429/38
(58) Field of Search .............................. 429/12, 24, 26, 429/34, 38, 129, 135, 143, 147

(56) References Cited

U.S. PATENT DOCUMENTS 5,300,370 A * 4/1994 Washington et al. .......... 429/34
6,048,633 A * 4/2000 Fujii et al. ..................... 429/32

FOREIGN PATENT DOCUMENTS

JP  10050327  2/1998  ............ H01M/8/02

* cited by examiner

Primary Examiner—Stephen Kalafut
Assistant Examiner—Angela J. Martin
(74) Attorney, Agent, or Firm—Lahive & Cockfield, LLP (57) ABSTRACT

Each of cooling medium flow passages provided for a first separator includes single main flow passage grooves communicating with a cooling medium inlet and a cooling medium outlet respectively, and branched flow passage grooves formed and branched between the main flow passage grooves. Accordingly, it is possible to greatly decrease the flow passage length. Therefore, it is possible to effectively avoid the occurrence of flow passage pressure loss in the superficial direction of the first separator, and it is possible to improve the system efficiency of the power generation.

12 Claims, 12 Drawing Sheets

FUEL CELL COMPRISING A SEPARATOR PROVIDED WITH COOLANT PASSAGES

BACKGROUND OF THE INVENTION

1. Field of the Invention

The present invention relates to a fuel cell comprising a fuel cell unit composed of an electrolyte interposed between an anode electrode and a cathode electrode, separators for supporting the fuel cell unit interposed therebetween, and a fluid passage for allowing a fluid such as a cooling medium to flow in a superficial direction of the separator.

2. Description of the Related Art

For example, the solid polymer electrolyte fuel cell comprises a fuel cell unit including an anode electrode and a cathode electrode disposed opposingly on both sides of an electrolyte composed of a polymer ion exchange membrane (cation exchange membrane), the fuel cell unit being interposed between separators. Usually, the fuel cell is used as a fuel cell stack comprising a predetermined number of fuel cell units and a predetermined number of separators which are stacked with each other.

In such a fuel cell, a fuel gas such as a gas principally containing hydrogen (hereinafter referred to as "hydrogen-containing gas"), which is supplied to the anode electrode, is converted into hydrogen ion on the catalyst electrode, and the ion is moved toward the cathode electrode via the electrolyte which is appropriately humidified. The electron, which is generated during this process, is extracted for an external circuit, and the electron is utilized as DC electric energy. An oxygen-containing gas such as a gas principally containing oxygen (hereinafter referred to as "oxygen-containing gas") or air is supplied to the cathode electrode. Therefore, the hydrogen ion, the electron, and the oxygen gas are reacted with each other on the cathode electrode, and thus water is produced.

In order to supply the fuel gas and the oxygen-containing gas to the anode electrode and the cathode electrode respectively, a porous layer having conductivity, for example, porous carbon paper is usually disposed on the catalyst electrode layer (electrode surface), and the porous layer is supported by the separator. Further, one or a plurality of gas flow passages designed to have a uniform widthwise dimension are provided on the mutually opposing surfaces of each of the separators. On the other hand, a cooling medium passage is formed on the surface of the separator disposed on a side opposite to the surface provided with the gas flow passage, with which it is intended that the heat generated by the power generation of the fuel cell unit is effectively removed.

Figure 12:
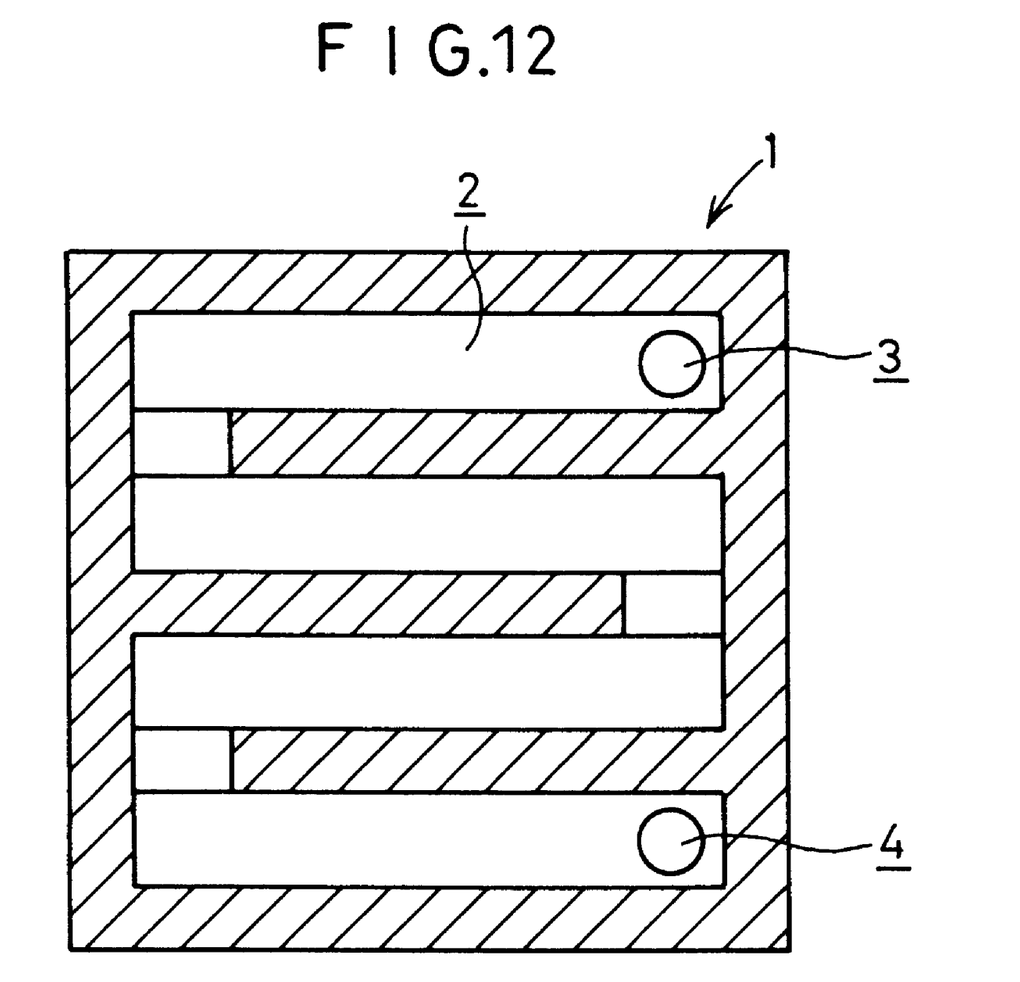
FIG. 12 illustrates a separator plate for constructing a conventional solid polymer fuel cell.

Such a technique is represented, for example, by a solid polymer electrolyte fuel cell disclosed in Japanese Laid-Open Patent Publication No. 10-50327, in which a separator plate 1 is provided with a cooling medium passage 2 as shown in FIG. 12. The cooling medium passage 2 is constructed to make communication with a cooling water inlet 3 and a cooling water outlet 4 so that the cooling water is allowed to flow in the direction of the gravity while meandering in the horizontal direction.

However, in the case of the conventional technique described above, the flow passage length of the cooling water passage 2 is considerably long, and many bent portions inevitably exist, because the cooling water is allowed to flow in the direction of the gravity with the cooling medium passage 2 meandering on the surface of the separator plate 1. For this reason, the following problem is pointed out. That is, the flow passage pressure loss is large, and the system efficiency of the power generation of the entire fuel cell is lowered.

SUMMARY OF THE INVENTION

A principal object of the present invention is to provide a fuel cell which makes it possible to effectively avoid the pressure loss in a fluid passage provided in a superficial direction of a separator, and improve the system efficiency of the power generation.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
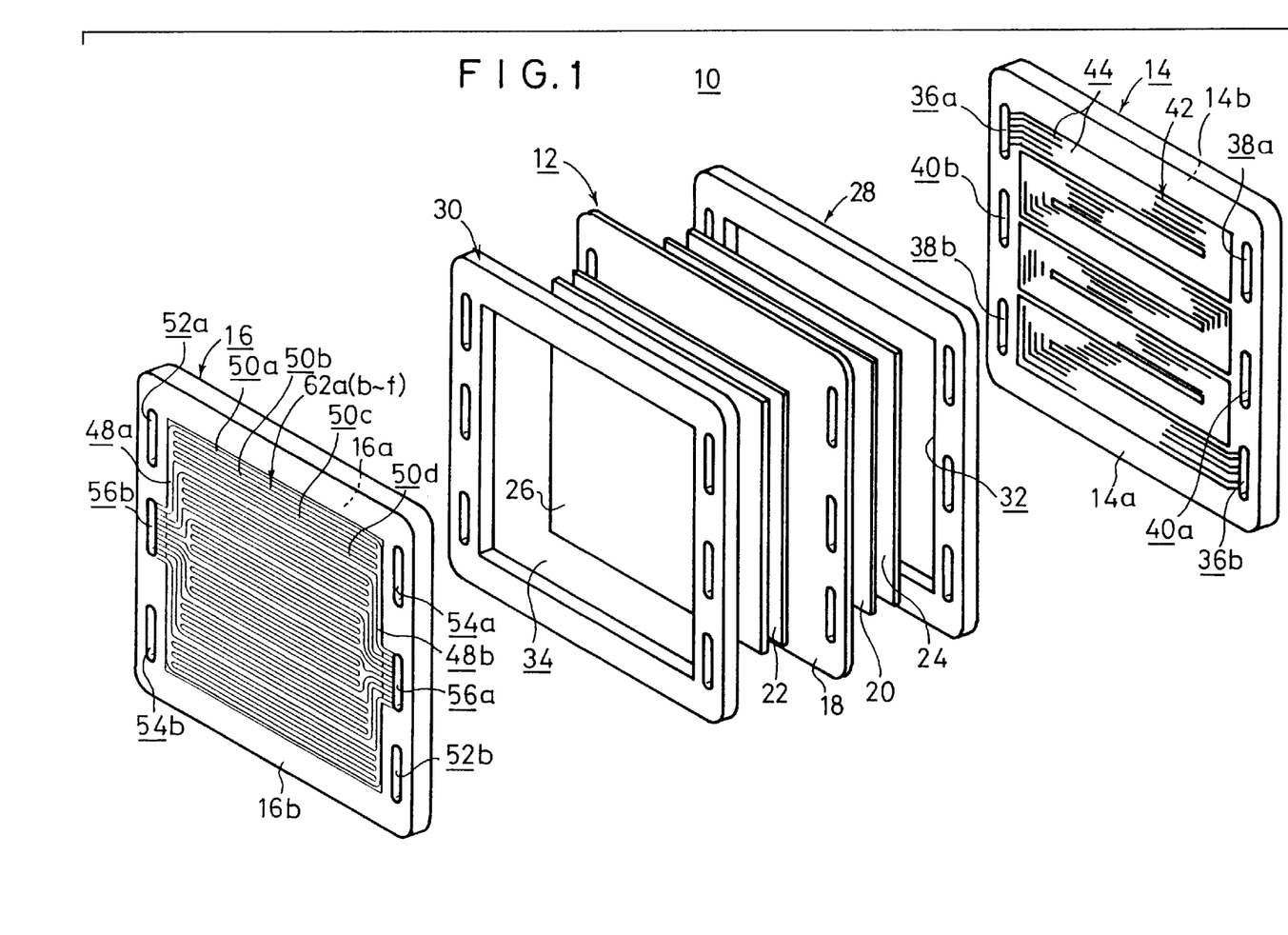
FIG. 1 shows an exploded perspective view illustrating major components of a fuel cell according to a first embodiment of the present invention.
Figure 2:
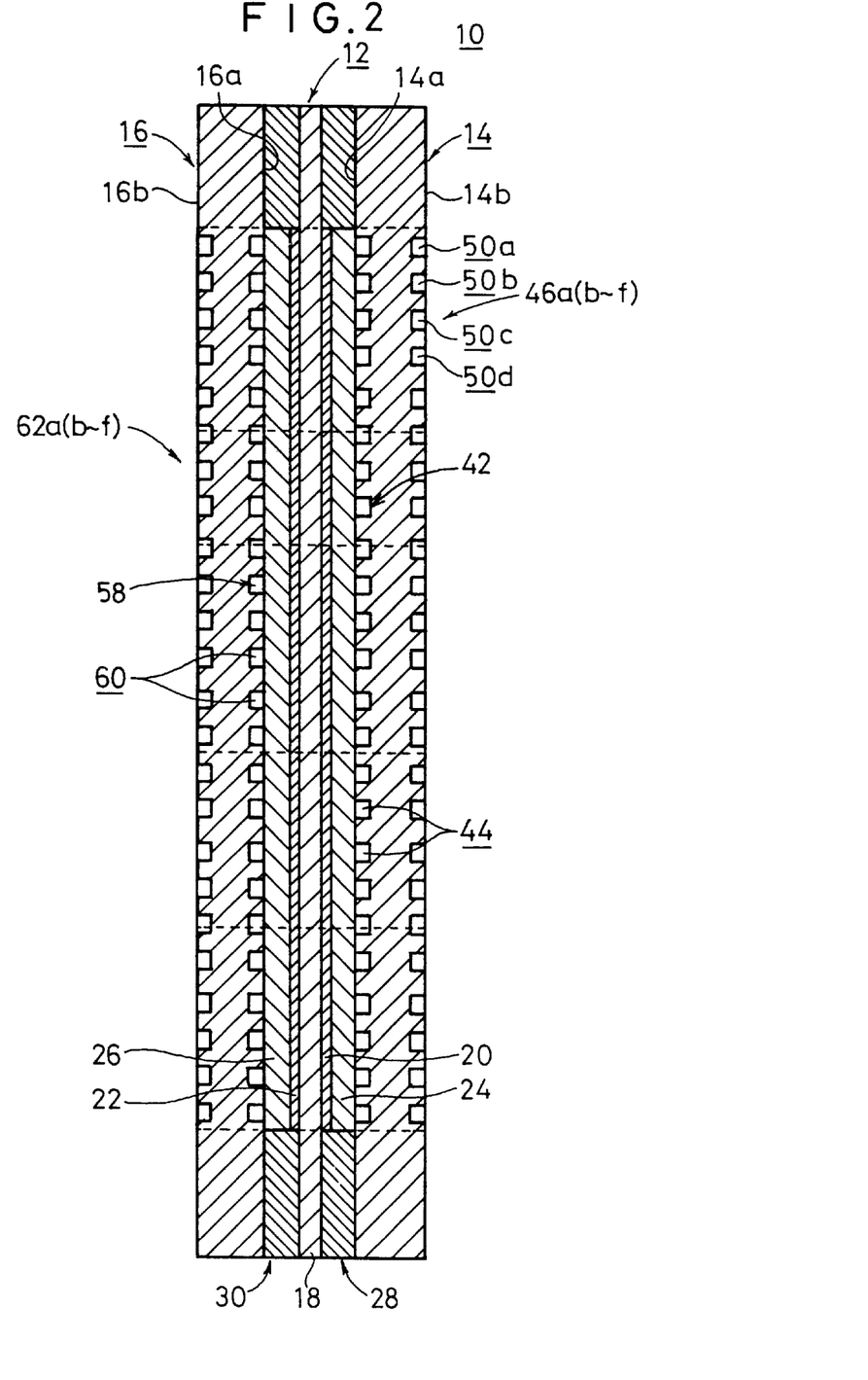
FIG. 2 shows a schematic longitudinal sectional view illustrating the fuel cell.

FIG. 1 shows an exploded perspective view illustrating major components of a fuel cell 10 according to a first embodiment of the present invention, and FIG. 2 shows a schematic longitudinal sectional view illustrating the fuel cell 10.

The fuel cell 10 comprises a fuel cell unit 12, and first and second separators 14, 16 for supporting the fuel cell unit 12 interposed therebetween. A plurality of sets of these components are optionally stacked with each other to construct a fuel cell stack. The fuel cell unit 12 includes a solid polymer ion exchange membrane 18, and an anode electrode 20 and a cathode electrode 22 which are arranged with the ion exchange membrane 18 intervening therebetween. First and second gas diffusion layers 24, 26, each of which is composed of, for example, porous carbon paper as a porous layer, are arranged for the anode electrode 20 and the cathode electrode 22.

First and second gaskets 28, 30 are provided on both sides of the fuel cell unit 12. The first gasket 28 has a large opening 32 for accommodating the anode electrode 20 and the first gas diffusion layer 24. The second gasket 30 has a large opening 34 for accommodating the cathode electrode 22 and the second gas diffusion layer 26. The fuel cell unit 12 and the first and second gaskets 28, 30 are interposed between the first and second separators 14, 16.

As shown in FIG. 1, a fuel gas inlet 36a for allowing a fuel gas such as a hydrogen-containing gas to pass therethrough, and an oxygen-containing gas inlet 38a for allowing an oxygen-containing gas as a gas containing oxygen or air to pass therethrough are provided at upper portions on the both sides of the first separator 14. A cooling medium inlet 40a and a cooling medium outlet 40b for allowing a cooling medium such as pure water or ethylene glycol to pass therethrough are provided at central portions on the both sides of the first separator 14. A fuel gas outlet 36b and an oxygen-containing gas outlet 38b are provided at diagonal positions with respect to the fuel gas inlet 36a and the oxygen-containing gas inlet 38a respectively at lower portions on the both sides of the first separator 14.

A fuel gas passage (fluid passage) 42, which communicates with the fuel gas inlet 36a and the fuel gas outlet 36b, is formed on the surface 14a of the first separator 14 opposed to the anode electrode 20. The fuel gas passage 42 includes one or a plurality of gas flow passage grooves 44. The gas flow passage groove 44 communicates with the fuel gas inlet 36a, it extends in the direction of gravity while meandering in the horizontal direction along with the superficial direction of the surface 14a, and it communicates with the fuel gas outlet 36b.

Figure 3:
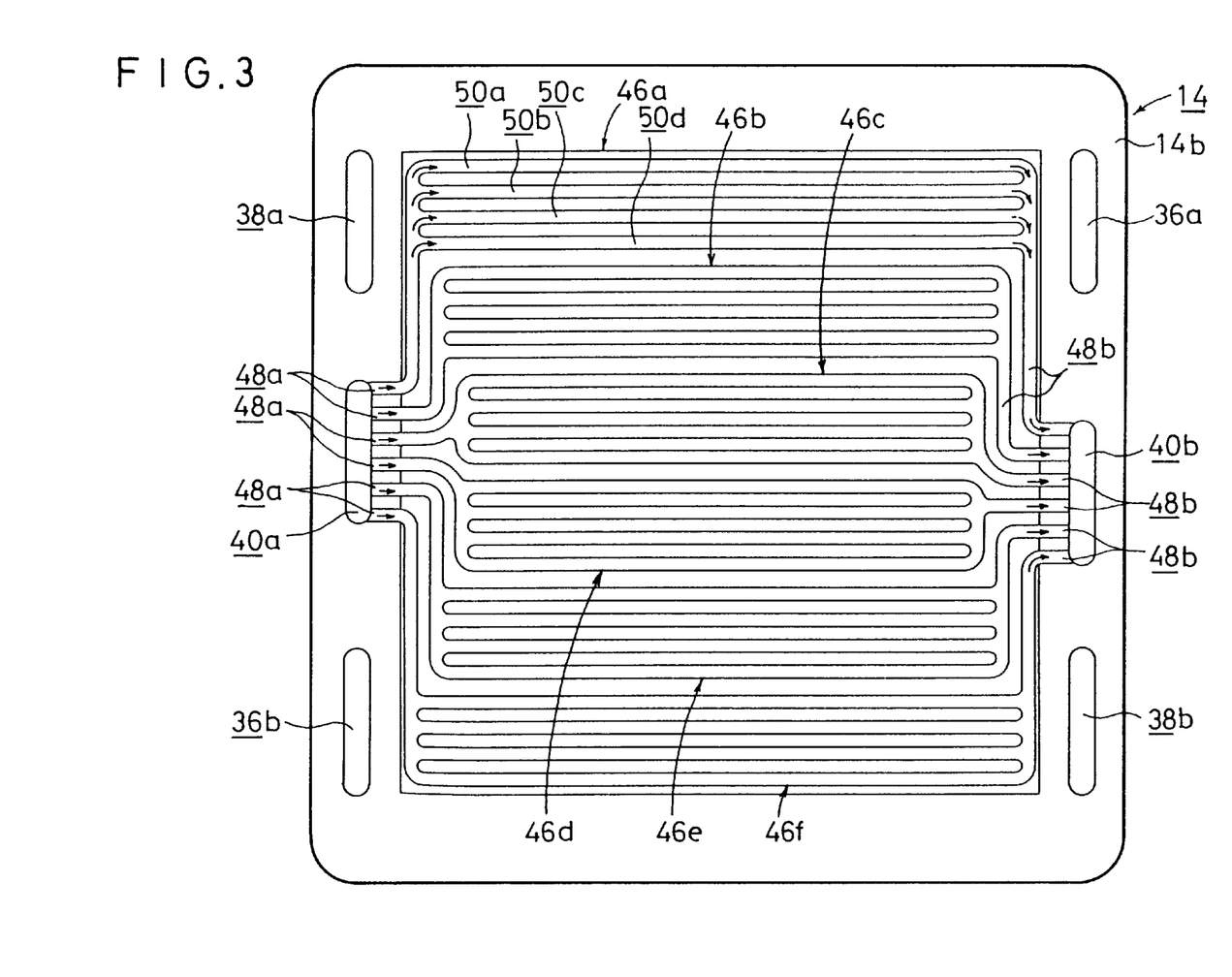
FIG. 3 shows a front view illustrating fluid passages provided for a first separator for constructing the fuel cell.

As shown in FIG. 3, cooling medium flow passages (fluid passages) 46a to 46f, which communicate with the cooling medium inlet 40a and the cooling medium outlet 40b, are provided on the surface 14b disposed on the side opposite to the surface 14a of the separator 14 The cooling medium flow passage 46a includes single main flow passage grooves 48a, 48b which communicate with the cooling medium inlet 40a and the cooling medium outlet 40b respectively, and a plurality of, for example, four branched flow passage grooves 50a to 50d provided between the main flow passage grooves 48a, 48b.

First ends of the main flow passage grooves 48a, 48b communicate with the cooling medium inlet 40a and the cooling medium outlet 40b respectively. Each of the main flow passage grooves 48a, 48b is bent once from the horizontal direction to the upward vertical direction to make communication with the branched flow passage grooves 50a to 50d at upper end portions of the surface 14b of the first separator 14. The branched flow passage grooves 50a to 50d are disposed in parallel to one another, and they extend substantially linearly along the surface 14b. The cooling medium flow passages 46b to 46f are constructed in the same manner as the cooling medium flow passage 46a. The same constitutive components are designated by the same reference numerals, detailed explanation of which will be omitted.

As shown in FIG. 1, a fuel gas inlet 52a and an oxygen-containing gas inlet 54a are formed at upper portions on the both sides of the second separator 16 to penetrate therethrough. A cooling medium inlet 56a and a cooling medium outlet 56b are formed at substantially central portions of the second separator 16 to penetrate therethrough. A fuel gas outlet 52b and an oxygen-containing gas outlet 54b are formed at lower portions on the both sides of the second separator 16 to penetrate therethrough at diagonal positions with respect to the fuel gas inlet 52a and the oxygen-containing gas inlet 54a respectively.

As shown in FIG. 2, an oxygen-containing gas flow passage (fluid passage) 58, which makes communication between the oxygen-containing gas inlet 54a and the oxygen-containing gas outlet 54b, is formed on the surface 16a of the second separator 16 opposed to the cathode electrode 22. The oxygen-containing gas flow passage 48 includes one or a plurality of gas flow passage grooves 60. The gas flow passage groove 60 extends in the direction of the gravity while meandering in the horizontal direction from the oxygen-containing gas inlet 54a, and it communicates with the oxygen-containing gas outlet 54b.

As shown in FIG. 1, cooling medium flow passages (fluid passages) 62a to 62f, which make communication between the cooling medium inlet 56a and the cooling medium outlet 56b, are formed on the surface 16b disposed on the side opposite to the surface 16a of the second separator 16. The cooling medium flow passages 62a to 62f are constructed in the same manner as the cooling medium flow passages 46a to 46f provided for the first separator 14. The same constitutive components are designated by the same reference numerals, detailed explanation of which will be omitted.

The operation of the fuel cell 10 according to the first embodiment constructed as described above will be explained below.

The fuel gas (for example, reformed gas) is supplied to the fuel cell 10, and the air (or oxygen-containing gas) is supplied thereto as the gas containing oxygen. The fuel gas is introduced into the fuel gas flow passage 42 from the fuel gas inlet 36a of the first separator 14. The fuel gas, which is supplied to the fuel gas flow passage 42, is introduced into the gas flow passage groove 44, and it is moved in the direction of gravity while meandering in the superficial direction of the surface 14a of the first separator 14. During this process. the hydrogen-containing gas in the fuel gas passes through the first gas diffusion layer 24, and it is supplied to the anode electrode 20 of the fuel cell unit 12. The fuel gas, which is not used, passes through the gas flow passage groove 44, and it is discharged from the fuel gas outlet 36b of the first separator 14.

On The other hand, as for the second separator 16, the air is supplied from the oxygen-containing gas inlet 54a to the oxygen-containing gas flow passage 58, and it is moved in the direction of gravity while meandering along the gas flow passage groove 60. During this process, the oxygen-containing gas in the air is supplied from the second gas diffusion layer 26 to the cathode electrode 22, while the air, which is not used, is discharged from the oxygen-containing gas outlet 54b, in the same manner as the fuel gas supplied to the fuel gas flow passage 42.

The cooling medium is also supplied to the fuel cell 10. The cooling medium is supplied to the cooling medium inlets 40a, 56a of the first and second separators 14, 16. As shown in FIG. 3, the cooling medium, which is supplied to the cooling medium inlet 40a of the first separator 14, is introduced into the respective main flow passage grooves 48a for constructing the cooling medium flow passages 46a to 46f. The cooling medium flows in the upward direction, in the horizontal direction, and in the downward direction along the main flow passage grooves 48a.

The cooling medium is introduced into the plurality of branched flow passage grooves 50a to 50d which are branched from the respective main flow passage grooves 48a. The cooling medium flows in the horizontal direction over the substantially entire surface of the surface 14b along the branched flow passage grooves 50a to 50d. After that, the cooling medium passes through the main flow passage grooves 48b into which the branched flow passage grooves 50a to 50d are merged, and it is discharged from the cooling medium outlet 40b. On the other hand, the cooling medium, which is supplied to the cooling medium inlet 56a of the second separator 16, passes through the cooling medium flow passages 62a to 62f, and it is moved linearly over the substantially entire surface of the surface 16b. After that, the cooling medium is discharged from the cooling medium outlet 40b.

In the first embodiment, the cooling medium flow passages 46a to 46f are provided on the surface 14b of the first separator 14. Each of the cooling medium flow passages 46a to 46f includes the single main flow passage grooves 48a, 48b which communicate with the cooling medium inlet 40a and the cooling medium outlet 40b respectively, and the plurality of branched flow passage grooves 50a to 50d which have the both ends integrally communicating with the main flow passage grooves 48a, 48b.

Accordingly, the flow passage length of each of the cooling medium flow passages 46a to 46f is remarkably shortened, as compared with those having one flow passage groove formed on the surface 14b to meander in the direction of the gravity or in the horizontal direction from the cooling medium inlet 40a to the cooling medium outlet 40b. Therefore, an effect is obtained such that the flow passage pressure loss is reduced, and the system efficiency of the power generation of the entire fuel cell 10 can be effectively improved.

Further, the branched flow passage grooves 50a to 50d are provided to extend substantially linearly on the surface 14b. Each of the main flow passage grooves 48a, 48b is designed to have the minimum number of bent portion (one portion or no such portion). Therefore, the number of bent portions of the flow passage is greatly reduced as a whole for the cooling medium flow passages 46a to 46f. The occurrence of the flow passage pressure loss, which would be otherwise caused by the bending, is reduced as less as possible. Especially, when the surface 14b has a large electrode area, it is possible to obtain a uniform and excellent temperature distribution only by increasing the number of the cooling medium flow passages 46a to 46f.

In the first embodiment, the first and second separators 14, 16 are provided with the cooling medium inlets 40a, 56a and the cooling medium outlets 40b, 56b. Manifolds are formed in the first and second separators 14, 16 themselves. Accordingly, it is unnecessary for the fuel cell 10 to possess any external manifold. It is easy to obtain a compact size of the entire fuel cell 10.

Figure 4:
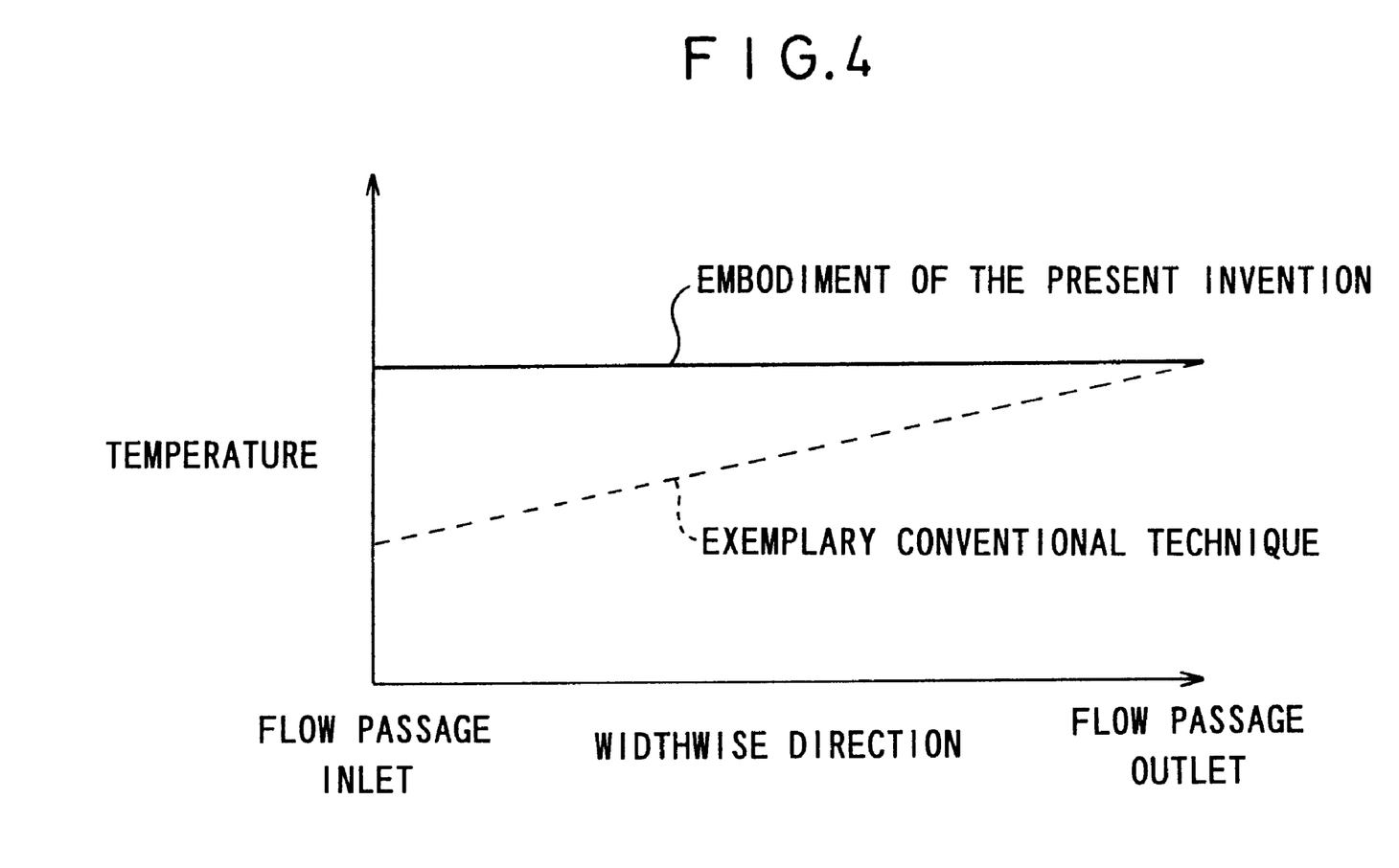
FIG. 4 illustrates the temperature distribution in the widthwise direction of the first separator concerning the first embodiment as compared with that concerning the exemplary conventional technique.

In the first embodiment, each of the cooling medium flow passages 46a to 46f has the branched flow passage grooves 50a to 50d which are provided substantially linearly in the widthwise direction of the first separator 14. Therefore, the difference in temperature in the widthwise direction of the surface 14b can be effectively reduced (see FIG. 4), as compared with those having one flow passage groove meandering, for example, in the direction of the gravity from the cooling medium inlet 40a to the cooling medium outlet 40b (exemplary conventional technique), because of the following reason. That is, the change in temperature of the cooling medium is suppressed to be small in the branched flow passage grooves 50a to 50d, because the branched flow passage grooves 50a to 50d are short in size.

Further, in the first embodiment, the cooling medium inlet 40a and the cooling medium outlet 40b are provided with the plurality of main flow passage grooves 48a, 48b, respectively, and the plurality of branched flow passage grooves 50a to 50d communicate with the main flow passage grooves 48a, 48b. Therefore, the cooling medium can be distributed smoothly and reliably on the entire surface 14b of the first separator 14. Further still, on both sides of the first separator 14, fuel gas inlet 36a, oxygen-containing gas inlet 38a, cooling medium inlet 40a, fuel gas outlet 36b, oxygen-containing gas outlet 38b, and cooling medium outlet 40b are provided. Accordingly, even though dimensions of the cooling medium inlet 40a and the cooling medium outlet 40b can not be set large, the cooling medium can be favorably distributed on the entire surface 14b of the first separator 14.

When the electrode area is small, the following arrangement may be used. That is, one cooling medium flow passage 46a is provided. The cooling medium inlet 40a and the cooling medium outlet 40b are allowed to make communication with the single main flow passage grooves 48a, 48b respectively. A plurality of branched flow passage grooves 50a to 50n (n: natural number), which are branched over the entire surface of the surface 14b, are disposed to make communication between the main flow passage grooves 48a, 48b.

Figure 5:
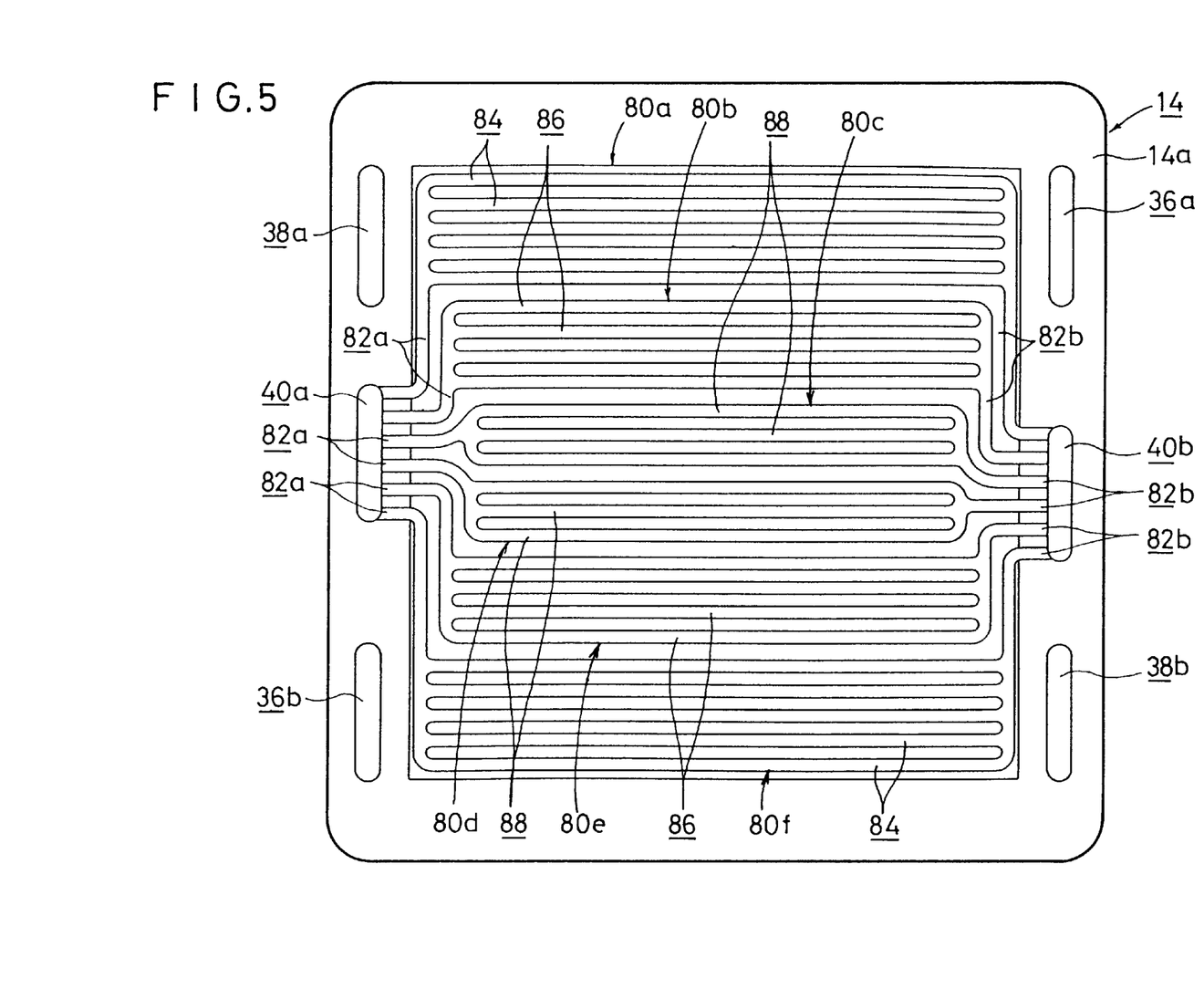
FIG. 5 shows a front view illustrating a first separator provided with fluid passages for constructing a fuel cell according to a second embodiment of the present invention.

FIG. 5 shows a front view illustrating a first separator 14 provided with cooling medium flow passages (fluid passages) 80a to 80f for constructing a fuel cell according to a second embodiment of the present invention. The arrangement, the function, and the effect of the second separator 16 are the same as those of the first separator 14. Therefore, the following description will be made concerning only the first separator 14. The same constitutive components as those of the first embodiment are designated by the same reference numerals.

Figure 6:
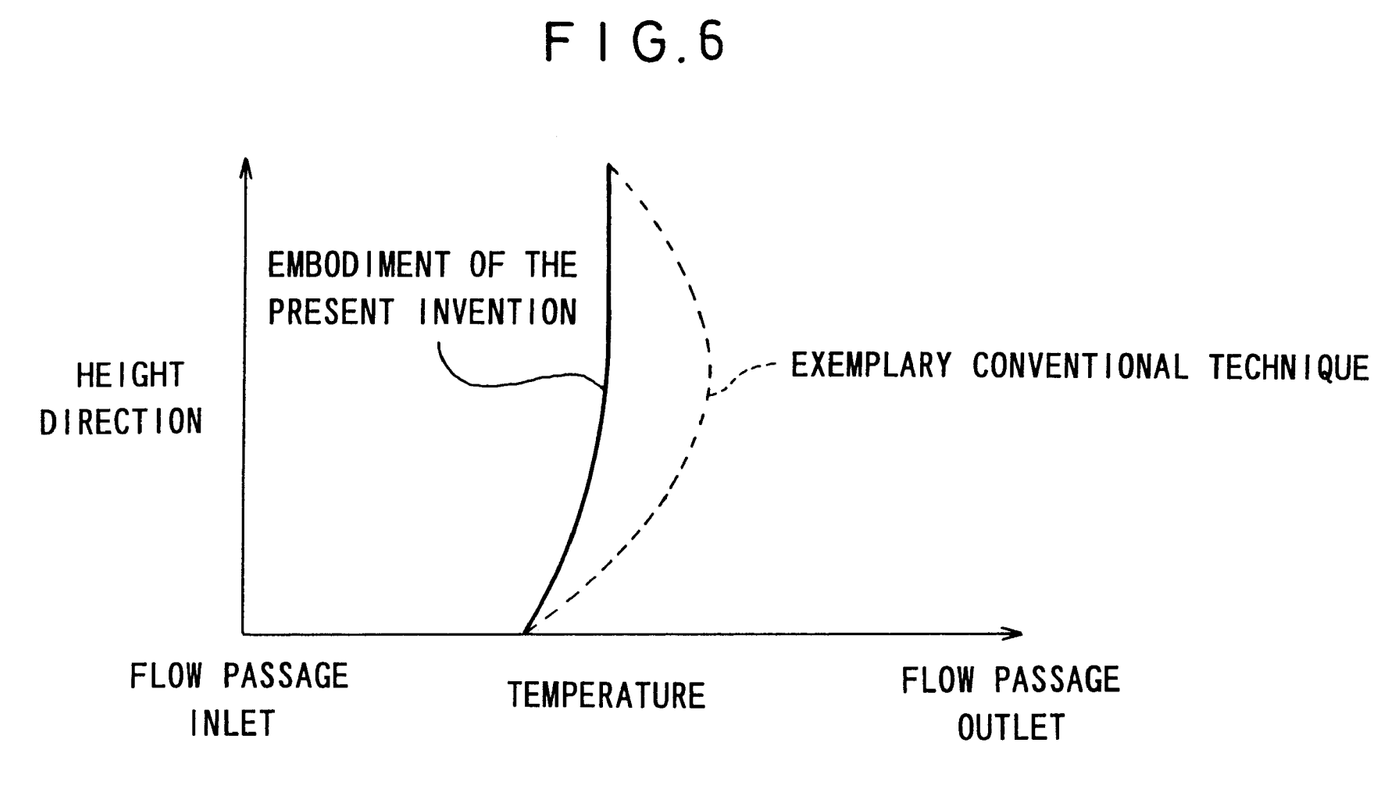
FIG. 6 illustrates the temperature distribution in the height direction of the separator concerning the second embodiment as compared with that of a conventional separator.

Each of the cooling medium flow passages 80a to 80f is provided with single main flow passage grooves 82a, 82b communicating with the cooling medium inlet 40a and the cooling medium outlet 40b respectively. In order to obtain a uniform temperature distribution over the surface 14a, the number of branched flow passage grooves is determined for each of them. That is, as shown in FIG. 6, the portion, at which the temperature of the electrode surface is high depending on the distribution of the reaction, is located at a position of approximately the middle of the height of the surface 14a of the first separator 14. The number of branched flow passage grooves is set to be small corresponding to the concerning height position. On the other hand, the number of branched flow passage grooves is increased on both upper and lower end sides at which the temperature is not increased so much on the surface 14a.

Specifically, each of the cooling medium flow passages 80a, 80f disposed on both the upper and lower end sides has five branched flow passage grooves 84. Each of the cooling medium flow passages 80b, 80e located inwardly with respect to the cooling medium flow passages 80a, 80f has four branched flow passage grooves 86. Each of the cooling medium flow passages 80c, 80d disposed at central portions has three branched flow passage grooves 88.

In the second embodiment constructed as described above, when the cooling medium is supplied to the cooling medium inlet 40a of the first separator 14, the cooling medium is introduced into the respective main flow passage grooves 82a which constitute the cooling medium flow passages 80a to 80f.

In this embodiment, the number of the branched flow passage grooves of the cooling medium flow passages 80c, 80d is three which is the minimum. The cooling medium, which is supplied from the main flow passage groove 82a to the respective branched flow passage grooves 88, has a relatively fast flow rate. Accordingly, it is possible to effectively suppress the increase in temperature at the central portion of the surface 14b. On the other hand, in the case of the cooling medium flow passages 80a, 80f having the maximum (five) number of the branched flow passage grooves, when the cooling medium is supplied from the main flow passage groove 82a to the respective branched flow passage grooves 84, the flow rate of the cooling medium is decreased to avoid the decrease in temperature in the vicinity of the both upper and lower ends of the surface 14b.

Accordingly, in the second embodiment, the central portion of the surface 14b of the first separator 14 is cooled, and both the upper and lower ends of the surface 14b do not decrease in temperature. Thus, it is possible to obtain an effect such that the temperature distribution can be made uniform over the entire surface of the surface 14b as shown in FIG. 6.

Further, in the second embodiment, it is possible to obtain the uniform temperature distribution in the height direction and in the widthwise direction of the first separator 14. Accordingly, especially when a fuel cell stack having a large electrode area is constructed, the temperature distribution over the surface 14b can be made uniform. Thus, it is possible to provide the fuel cell 10 which is excellent in power generation performance.

Figure 7:
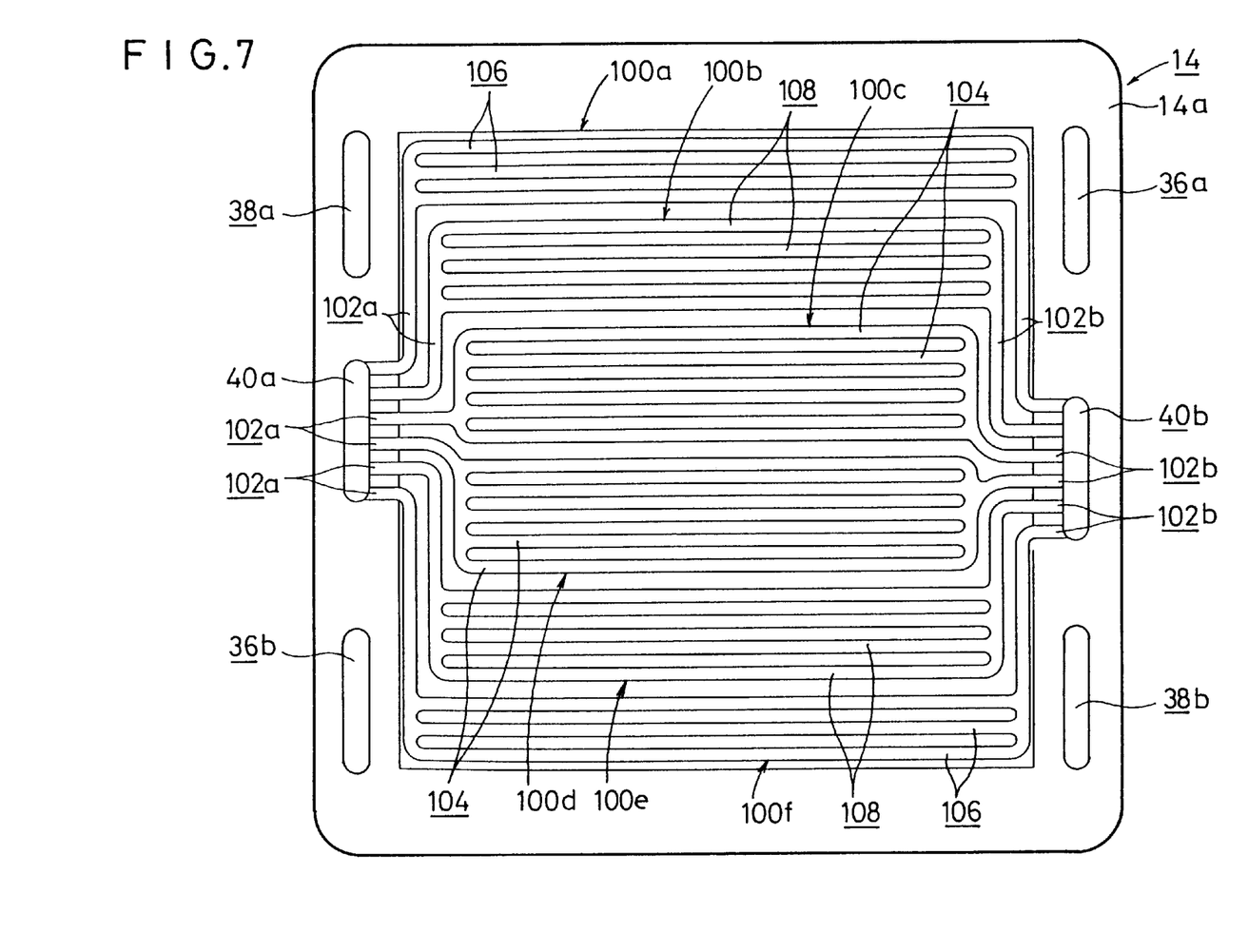
FIG. 7 shows a front view illustrating a first separator provided with fluid passages for constructing a fuel cell according to a third embodiment of the present invention.

FIG. 7 shows a front view illustrating a first separator 14 provided with cooling medium flow passages (fluid passages) 100a to 100f for constructing a fuel cell according to a third embodiment of the present invention.

Each of the cooling medium flow passages 100a to 100f is provided with single main flow passage grooves 102a, 102b communicating with the cooling medium inlet 40a and the cooling medium outlet 40b respectively. The number of branched flow passage grooves is determined for each of them depending on the temperature distribution over the electrode surface. In the third embodiment, the number of branched flow passage grooves is increased at the place at which the temperature of the electrode surface is high depending on the distribution of the reaction over the surface 14b. Accordingly, the temperature of the cooling medium passing therethrough is increased to effectively utilize the waste heat.

That is, it is assumed that the specific heat capacity is represented by "c", the mass flow rate is represented by "w" (kg/s), and the temperature difference between the cooling medium inlet and outlet is represented by "$\Delta T$" (° C.). The amount of heat Q (J/s) received by the cooling medium having the temperature difference of $\Delta T$ is represented by $Q = c \times w \times \Delta T$. Therefore, when an identical amount of heat Q is deprived, if the mass flow rate "w" is increased, then the temperature difference $\Delta T$ is decreased, and it is possible to lower the outlet temperature of the cooling medium. On the other hand, if the mass flow rate "w" is decreased, then the temperature difference $\Delta T$ is increased, and it is possible to raise the outlet temperature.

Based on the above, each of the cooling medium flow passages 100c, 100d disposed corresponding to the central portions having the highest temperature on the surface 14b has the largest number of five branched flow passage grooves 104. Each of the cooling medium flow passages 100a, 100f disposed on both the upper and lower end sides of the surface 14b has the minimum number of three branched flow passage grooves 106. Each of the cooling medium flow passages 100b, 100e has four branched flow passage grooves 108.

In the third embodiment constructed as described above, the cooling medium, which is introduced into the cooling medium flow passages 100c, 100d provided corresponding to the portions at which the temperature of the electrode surface is the highest on the surface 14a, has the flow rate which is decreased when the cooling medium is introduced from the main flow passage groove 102a into the five branched flow passage grooves 104. The cooling medium is discharged from the main flow passage groove 102b to the cooling medium outlet 40b in a state in which the temperature is raised. Accordingly, the cooling medium, which is discharged from the cooling medium outlet 40b, has a considerably raised temperature. Therefore, an effect is obtained such that the waste heat is effectively utilized only by supplying the discharged cooling medium to any portion intended to be heated.

In the second or third embodiment, the cooling medium inlet 40a and the cooling medium outlet 40b are provided with the plurality of main flow passage grooves 82a, 82b or 102a, 102b, respectively. Therefore, the plurality of main flow passage grooves 82a, 82b or 102a, 102b are provided with the branched flow passage grooves 84, 86, 88 or 104, 106, 108 such that each number of the branched flow passage grooves is different from one another. Accordingly, the cooling medium can be favorably distributed depending on a condition of the power generation.

Figure 8:
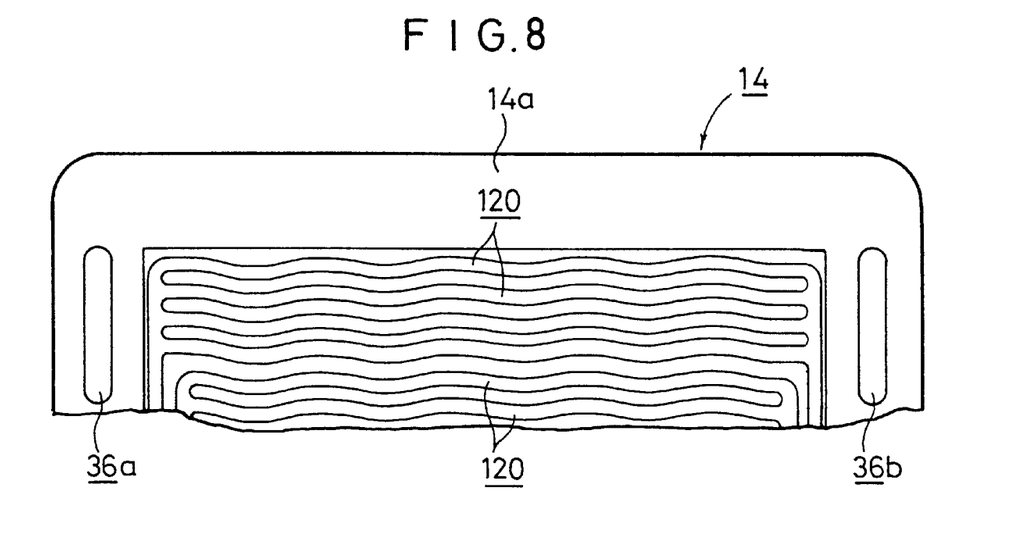
FIG. 8 illustrates wavy flow passage grooves.
Figure 9:
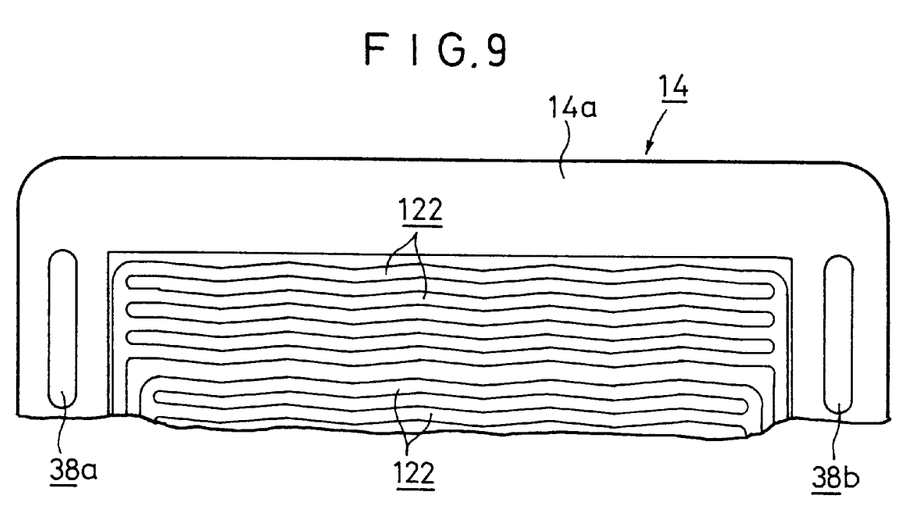
FIG. 9 illustrates saw teeth-shaped flow passage grooves.

In the first to third embodiments, each flow passage groove is substantially linear. However, it is also preferable that the flow passage groove has waviness to some extent. For example, it is possible to use a wavy flow passage groove 120 as shown in FIG. 8, and a saw teeth-shaped flow passage groove 122 as shown in FIG. 9.

Figure 10:
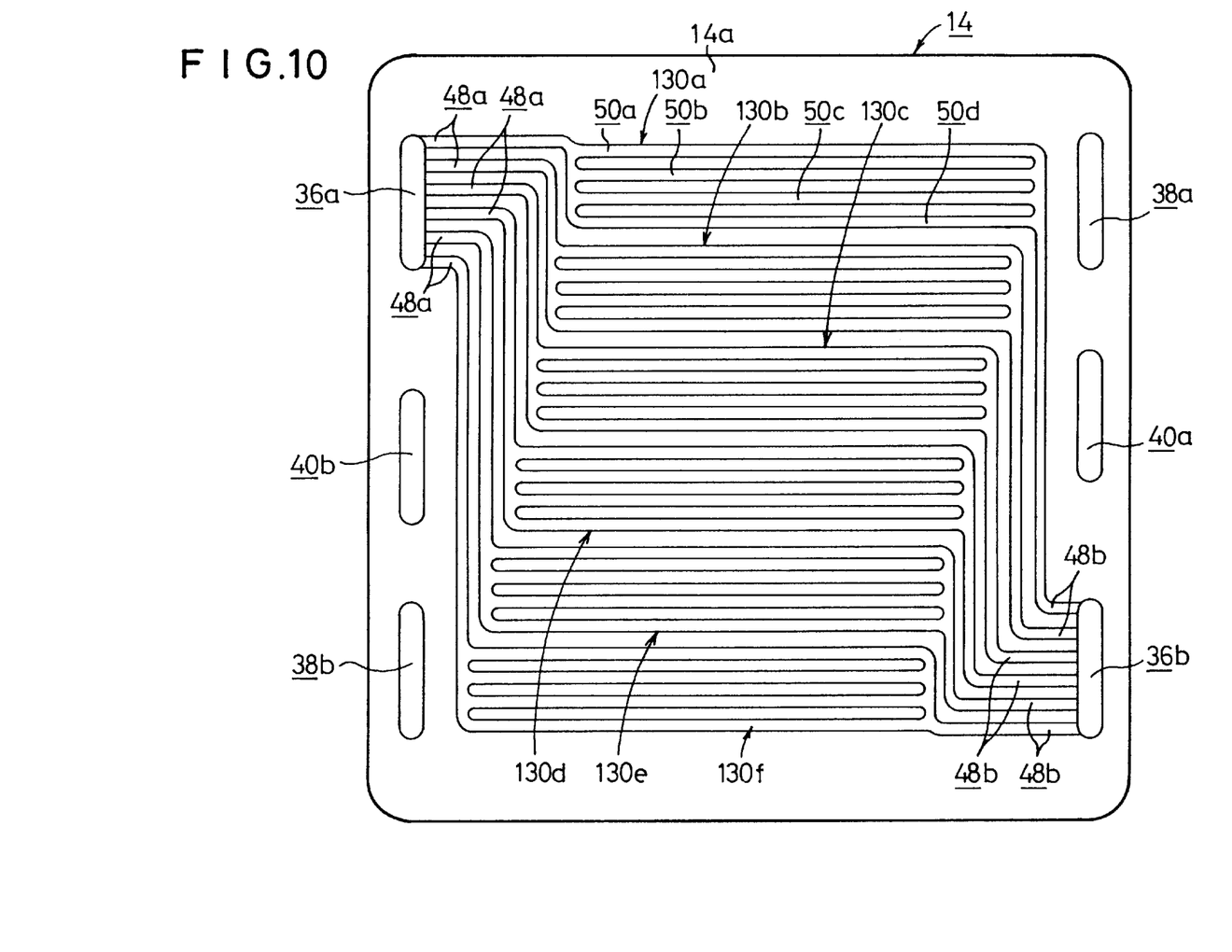
FIG. 10 shows a front view illustrating fuel gas flow passages as fluid passages provided for the first separator for constructing the fuel cell.
Figure 11:
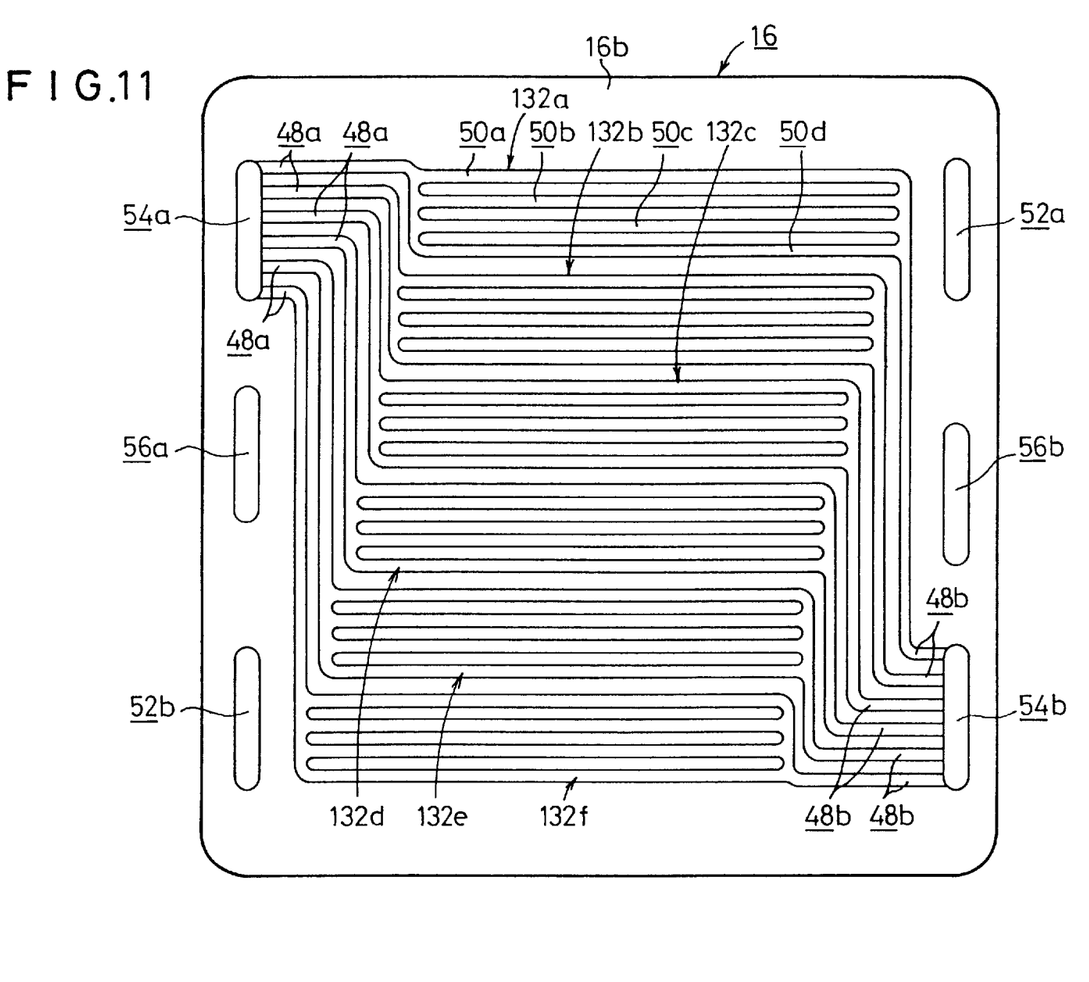
FIG. 11 shows a front view illustrating oxygen-containing gas flow passages as fluid passages provided for a second separator for constructing the fuel cell.

In the first to third embodiments, the fluid passage has been explained with the cooling medium flow passages 46a to 46f, 62a to 62f, 80a to 80f, and 10a to 10f. However, the fuel gas flow passage and the oxygen-containing gas flow passage may be constructed in the same manner as described above. As shown in FIG. 10, fuel gas flow passages 130a to 130f as fluid passages may be formed on the surface 14a of the first separator 14. As shown in FIG. 11, oxygen-containing gas flow passages 132a to 132f as fluid passages may be formed on the surface 16a of the second separator 16. The same constitutive components as those of the cooling medium flow passages 46a to 46f are designated by the same reference numerals, detailed explanation of which will be omitted.

Accordingly, the gas flow passage length can be effectively shortened for the fuel gas flow passages 130a to 130f and the oxygen-containing gas flow passages 132a to 132f. The pressure loss is avoided for the fuel gas and the oxygen-containing gas, and it is possible to easily improve the system efficiency of the power generation of the entire fuel cell 10.

In the fuel cell according to the present invention, for example, the fluid passage, which is used to allow the fluid including the cooling medium to flow in the superficial direction of the separator, is branched into the plurality of flow passages between the fluid inlet and the fluid outlet.

Therefore, the flow passage length can be effectively reduced, and the pressure loss can be decreased. Thus, it is possible to effectively improve the system efficiency of the power generation of the entire fuel cell.

What is claimed is:

1. A fuel cell comprising:
   a fuel cell unit including an electrolyte interposed between an anode electrode and a cathode electrode,
   a separator for supporting said fuel cell unit interposed therebetween; and
   a fluid passage for allowing a fluid to flow in a superficial direction of said separator, the fluid containing at least any one of a cooling medium for cooling said fuel cell unit, a fuel gas for being supplied to said anode electrode, and an oxygen-containing gas for being supplied to said cathode electrode, wherein:
      said fluid passage includes a plurality of flow passage grooves which extend from a fluid inlet on a side of said fluid inlet on a surface of said separator and branch to increase the number of flow passage grooves extending along said surface of said separator, and said plurality of flow passage grooves are merged on a side of a fluid outlet thereby decreasing the number of said flow passage grooves, and the decreased number of said flow passage grooves extend along said surface before reaching said fluid outlet.

2. The fuel cell according to claim 1, wherein said plurality of flow passage grooves extend substantially linearly in a range from a portion at which said fluid passage is branched on said side of said fluid inlet to a portion at which said plurality of flow passage grooves are merged on said side of said fluid outlet.

3. The fuel cell according to claim 2, wherein:
   said fluid passage includes single main flow passage grooves communicating with said fluid inlet and said fluid outlet respectively, and said plurality of branched flow passage grooves provided between said main flow passage grooves; and
   between said fluid inlet and said fluid outlet, said separator is provided with a plurality of sets of fluid passages, each of said sets having an equal number of fluid passages.

4. The fuel cell according to claim 3, wherein:
   said fluid passage is a cooling medium passage; and
   said cooling medium passage is designed such that a number of said flow passage grooves branched on said surface of said separator differs depending on a temperature distribution over said surface of said separator.

5. The fuel cell according to claim 4, wherein said cooling medium passage is designed such that a number of said flow passage grooves corresponding to a central portion of said surface of said separator is smaller than a number of said flow passage grooves corresponding to both ends of said surface of said separator.

6. The fuel cell according to claim 4, wherein said cooling medium passage is designed such that a number of said flow passage grooves corresponding to a central portion of said surface of said separator is larger than a number of said flow passage grooves corresponding to both ends of said surface of said separator.

7. The fuel cell according to claim 1, wherein:
   said fluid passage is provided on said surface of said separator; and
   said separator includes said fluid inlet and said fluid outlet communicating with said fluid passage, said fluid inlet and said fluid outlet being formed to penetrate through said separator.

8. The fuel cell according to claim 7, wherein said plurality of flow passage grooves extend substantially linearly in a range from a portion at which said fluid passage is branched on said side of said fluid inlet to a portion at which said plurality of flow passage grooves are merged on said side of said fluid outlet.

9. The fuel cell according to claim 8, wherein:
   said fluid passage includes single main flow passage grooves communication with said fluid inlet and said fluid outlet respectively, and said plurality of branched flow passage grooves provided between said main flow passage grooves; and
   between said fluid inlet and said fluid outlet, said separator is provided with a plurality of sets of fluid passages, each of said sets having an equal number of fluid passages.

10. The fuel cell according to claim 9, wherein:
    said fluid passage is a cooling medium passage; and
    said cooling medium passage is designed such that a number of said flow passage grooves branched on said surface of said separator differs depending on a temperature distribution over said surface of said separator.

11. The fuel cell according to claim 10, wherein said cooling medium passage is designed such that a number of said flow passage grooves corresponding to a central portion of said surface of said separator is smaller than a number of said flow passage grooves corresponding to both ends of said surface of said separator.

12. The fuel cell according to claim 10, wherein said cooling medium passage is designed such that a number of said flow passage grooves corresponding to a central portion of said surface of said separator is larger than a number of said flow passage grooves corresponding to both ends of said surface of said separator.

* * * * *